(12) United States Patent
Hartinger et al.

(10) Patent No.: US 7,976,419 B2
(45) Date of Patent: Jul. 12, 2011

(54) CONTROL OF THE FLOW RATE IN A TRANSMISSION OIL COOLER

(75) Inventors: Chip Hartinger, Brighton, MI (US); Steve A. Frait, Milan, MI (US); James T. Gooden, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 455 days.

(21) Appl. No.: 12/332,427

(22) Filed: Dec. 11, 2008

(65) Prior Publication Data
US 2010/0151981 A1 Jun. 17, 2010

(51) Int. Cl.
*F16H 57/04* (2010.01)
*F01M 5/00* (2006.01)
*B60H 1/00* (2006.01)
(52) U.S. Cl. .......................... 475/159; 184/6.22; 165/271
(58) Field of Classification Search .................. 475/159; 184/6.21, 6.22, 6.12
See application file for complete search history.

(56) References Cited

U.S. PATENT DOCUMENTS

| 4,006,652 | A | 2/1977 | Murakami |
| 4,050,332 | A | 9/1977 | Taga |
| 4,751,858 | A | 6/1988 | Iwatsuki |
| 4,833,946 | A | 5/1989 | Lemieux |
| 5,217,085 | A * | 6/1993 | Barrie et al. ............... 184/104.1 |
| 5,513,732 | A | 5/1996 | Goates |
| 6,358,185 | B1 | 3/2002 | Bertsche et al. |
| 6,520,293 | B1 * | 2/2003 | Ogawa et al. ................ 184/6.22 |
| 7,243,767 | B2 | 7/2007 | Gierer et al. |
| 2001/0009881 | A1 | 7/2001 | Albs et al. |
| 2008/0234903 | A1 | 9/2008 | Satou |

\* cited by examiner

*Primary Examiner* — Dirk Wright
(74) *Attorney, Agent, or Firm* — David B. Kelley; MacMillan, Sobanski & Todd, LLC

(57) ABSTRACT

A system for controlling a flow rate in a vehicle transmission includes a source of fluid exiting a torque converter, an oil cooler, a source of control pressure, and a valve for regulating a rate of fluid flow from the torque converter to the cooler in response to the control pressure.

15 Claims, 6 Drawing Sheets

CONTROL OF THE FLOW RATE IN A TRANSMISSION OIL COOLER

BACKGROUND OF THE INVENTION

1. Field of the Invention

This invention relates generally to a hydraulic circuit and, more particularly, to an apparatus for regulating or limiting the flow rate in an oil cooler of an automatic transmission.

2. Description of the Prior Art

The required rate of flow of lubricant in an automatic transmission varies with its duty cycle. Lubrication flow rate in automatic transmissions can be controlled using several methods including constant pressure regulator supply, a fixed orifice, priority feed from main transmission pressure regulator, dependant feed from a torque converter or other fluid sources, and variations or combinations of theses methods. Most lubrication schemes for automatic transmissions use a resultant flow rate for all operating conditions. The resultant flow rate requires that lubrication oil in excess of current operating requirements be directed into the transmission components, thereby creating windage losses due to oil shearing in the transmission.

A need exists in the industry for a technique to regulate the flow rate of lubricant in a transmission oil cooler such that it varies with the duty cycle, i.e., the flow rate is high when the magnitude of the load on the transmission is large and the flow rate is relatively low when the magnitude of power being transmitted is low.

SUMMARY OF THE INVENTION

A system for controlling a flow rate in a vehicle transmission includes a source of fluid exiting a torque converter, a main regulator oil feed source, an oil cooler, a source of control pressure, and a valve for regulating a rate of fluid flow from the torque converter and main regulator to the cooler in response to the control pressure.

A solenoid-operated valve, which varies the oil flow to match the transmission lubrication system requirement, prevents unnecessary parasitic losses due to windage.

The solenoid-operated valve further permits the size of a pump in the transmission hydraulic system to be reduced, thereby reducing pumping losses.

By reducing parasitic drag in this way, this system increases fuel economy of the vehicle.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
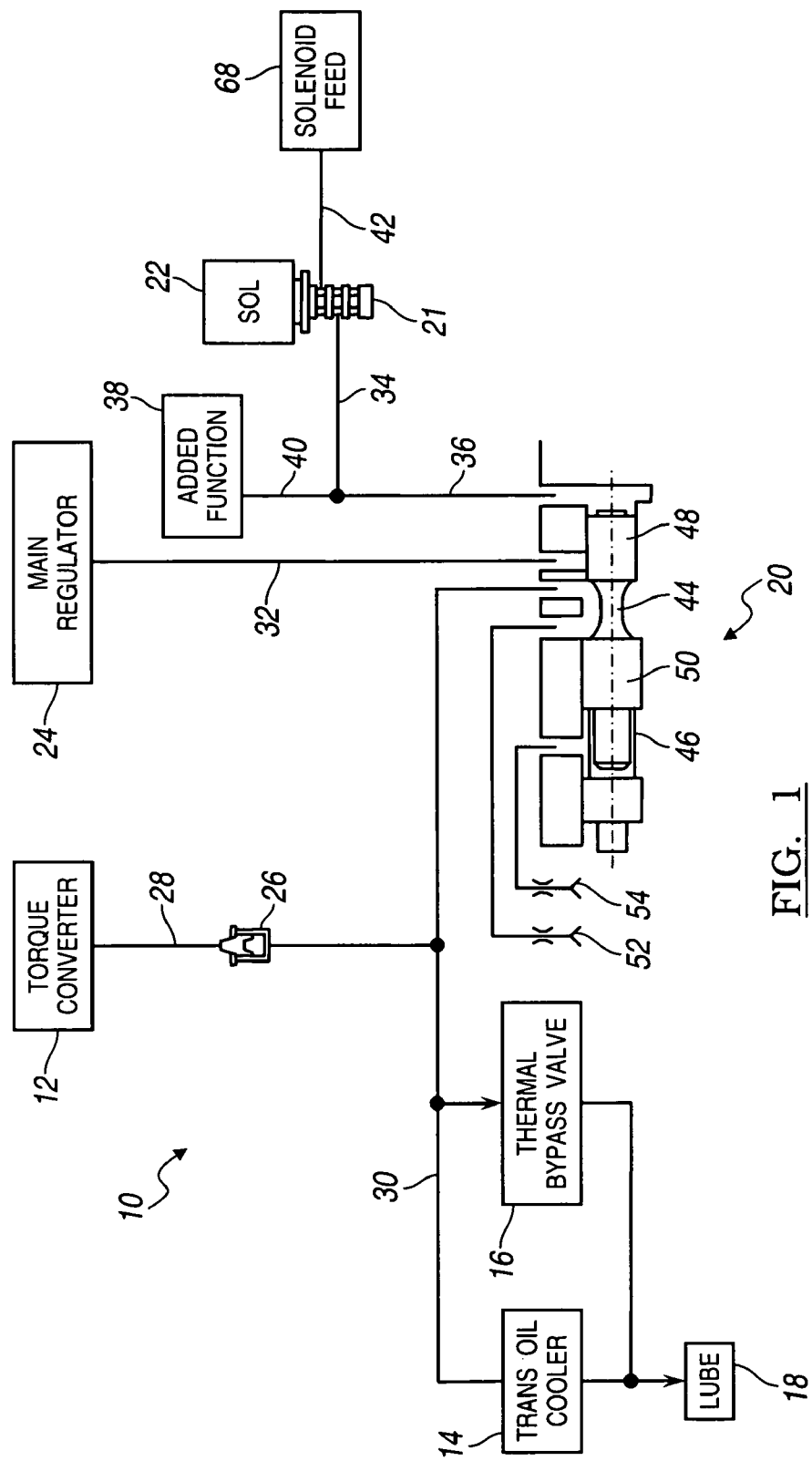
FIG. 1 is a schematic diagram of a hydraulic circuit that regulates pressure in and the flow rate to the oil cooler of an automatic transmission.

Referring now to the drawings, there is illustrated in FIG. 1 a hydraulic system 10 that includes a torque converter 12, oil cooler 14, temperature actuated bypass valve 16, lube circuit 18, lube control valve 20, valve 21, solenoid 22, main regulator valve 24 and anti-drainback valve 26.

Line 28 carries transmission fluid (ATF) from the converter 12 to a line 30, which carries fluid to cooler 14, bypass valve 16 and control valve 20. Line 32 carries fluid at regulated pressure from main regulator valve 24 to control valve 20. Lines 34, 36 carry control pressure to control valve 20. Line 42 carries solenoid feed 68 pressure to valve 21.

The torque converter 12 is a modified form of fluid coupling that is used to transfer rotating power from a power source, such as an internal combustion engine or electric motor, to a rotating driven load. The torque converter normally takes the place of a mechanical clutch, allowing the load to be separated from the power source, however, a torque converter is able to multiply torque when there is a substantial difference between input and output rotational speed, thus providing the equivalent of a reduction gear. The torque converter 12 includes three rotating elements: an impeller or pump, which is mechanically driven by the power source; a turbine, which is hydrokinetically driven by fluid exiting the impeller; and a stator, interposed between the impeller and turbine for redirecting fluid flow exiting the turbine and returning to the impeller.

The oil cooler 14 is a heat exchanger in which heat contained in fluid exiting the torque converter 12 or main regulator 24, is exchanged to engine coolant, or ambient air flowing through the cooler or a combination.

Solenoid 22 may be an on/off solenoid, pulse width modulated (PWM) solenoid, or variable force solenoid (VFS). Solenoid 22 may also be multiplexed with another function 38, such as line pressure regulation control carried in line 40.

Lube control valve 20 includes a spool 44, which moves in a chamber in response to forces developed by various pressures on the spool lands 48, 50 and the force of a spring 46. Control pressure on the end of land 48 urges spool 44 leftward. The force of spring 46 urges spool 44 rightward. Pressure carried in line 30 and applied to differential areas of lands 48, 50, urges spool 44 leftward. Vent port 52 communicates a passage in the chamber to a source of low pressure and carries fluid that leaks past the spool 20 to a low pressure sump.

In operation, when pressure in line 36 is high, spool 20 moves to the left-hand end of the valve chamber, the position shown in FIG. 1, thereby closing line 32 and opening a connection through valve 20 between line 28 and vent port 52. This action reduces or substantially eliminates flow from converter 12 to the oil cooler 14 and the lube circuit 18.

When pressure in lines 34, 36 is low, spool 44 moves to the right-hand end of the valve chamber, thereby closing a connection between vent port 52 and the oil cooler 14 and lube circuit 18. This action maximizes the rate of fluid flow from the torque converter 12 to the oil cooler 14, provided the oil temperature is lower than a reference temperature, at which the bypass valve 16 opens. Flow from the oil cooler 14 and bypass valve 16 is directed to the lube circuit 18.

Valve 20 is a regulator valve, which varies the flow rate to the cooler 14 in response to the balance of pressure forces and the spring force on spool 44, which establish the position of the spool in the valve chamber. Therefore, the rate of fluid flow between the torque converter 12 and oil cooler 14 varies with the magnitude of control pressure carried in lines 34, 36 to valve 20.

Valve 20, being a regulating type valve, will have a valve overlap that can be open-centered or closed-centered. The closed-center valve, has a null position, that centers the valve where circuit 30 does not receive or exhaust fluid from valve 20. Due to the valve overlap, fluid will neither exhaust out of circuit 52 nor enter from circuit 32.

Figure 2:
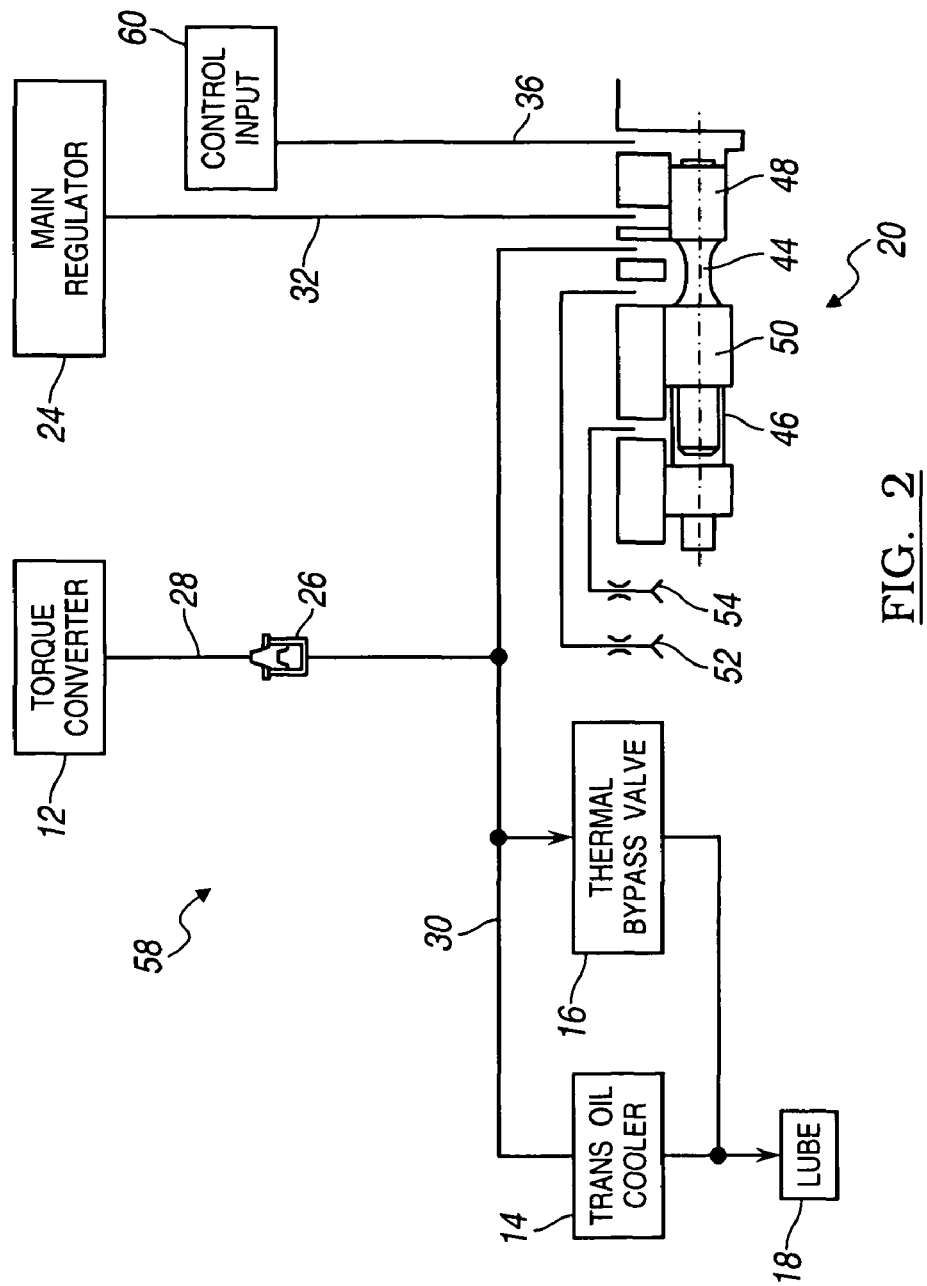
FIG. 2 is a schematic diagram of an alternate embodiment of the circuit of FIG. 1.

Referring to the system 58 of FIG. 2, the control input 60 carried in line 36 to control valve 20 is a pressure signal from another circuit, e.g., line pressure or a clutch pressure.

The flow rate to oil cooler 14 and lube circuit 18 decreases when the magnitude of pressure in line 36 increases because valve 20 opens a connection between vent port 52 and the torque converter. The flow rate to oil cooler 14 and lube circuit 18 increases when the magnitude of pressure in line 36 decreases as valve 20 closes the connection between vent port 54 and the torque converter 12.

However, by redirecting the control input pressure in line 36 to the left-hand end of valve 20, the flow rate to oil cooler 14 and lube circuit 18 increases when the magnitude of the control pressure in line 36 increases, and the flow rate to oil cooler 14 and lube circuit 18 decreases when the magnitude of pressure in line 36 decreases.

If reduced lube flow is desired in a particular gear, e.g., sixth gear, a combination of pressure signals that engage the control elements required for the transmission to produce sixth gear can be used to actuate two latch valves. When both valves are latched in the manner of an AND logic gate, indicating that the transmission is operating in sixth gear, high pressure from control input 60 is directed through line 36 to the right-hand side of valve 20. Therefore, the flow rate to oil cooler 14 and lube circuit 18 decreases when the transmission operates in sixth gear.

When transmission operates in a gear other than sixth gear, at least one of the latch valves will unlatch causing control pressure 20 to decrease and the flow rate to oil cooler 14 and lube circuit 18 to increase.

Figure 3:
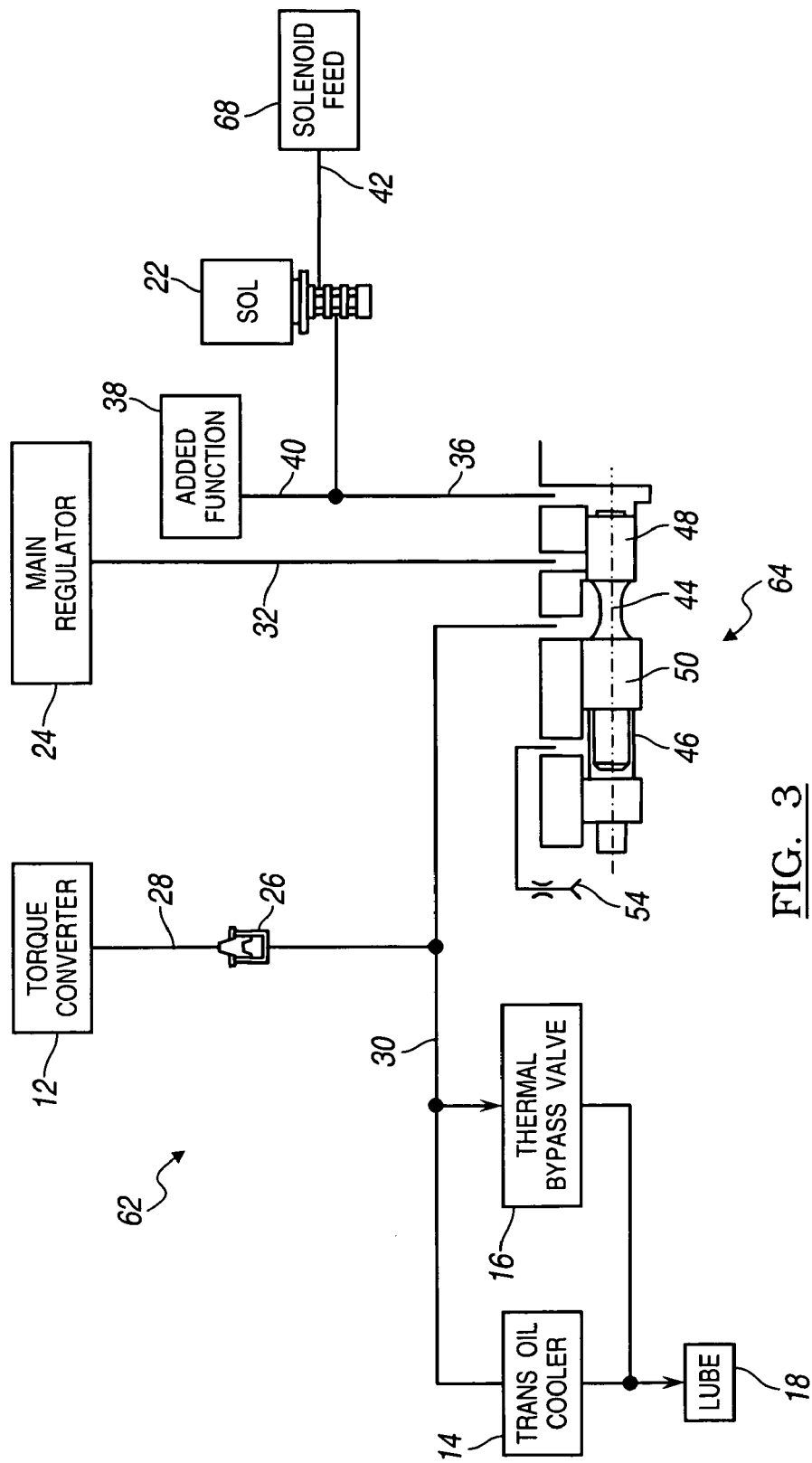
FIG. 3 is a schematic diagram of a hydraulic circuit that limits the flow rate to a transmission oil cooler.

FIG. 3 illustrates a system 62 in which the regulating control valve 20 of FIG. 1 has been replaced by a limit valve 64, in which vent port 52 is eliminated.

In operation, when solenoid pressure in line 36 is high, spool 44 moves to the left-hand end of the valve chamber, the position shown in FIG. 3, thereby maintaining a connection between feed from converter 12 in line 28 and the cooler 14 and no longer reducing the flow to the cooler.

When solenoid pressure in line 36 is low, the force of spring 46 moves spool 44 to the right-hand end of the valve chamber, thereby opening a connection between valve 64 and lines 30, 32. This action maximizes the rate of fluid flow to the oil cooler 14 and bypass valve 16.

Figure 4:
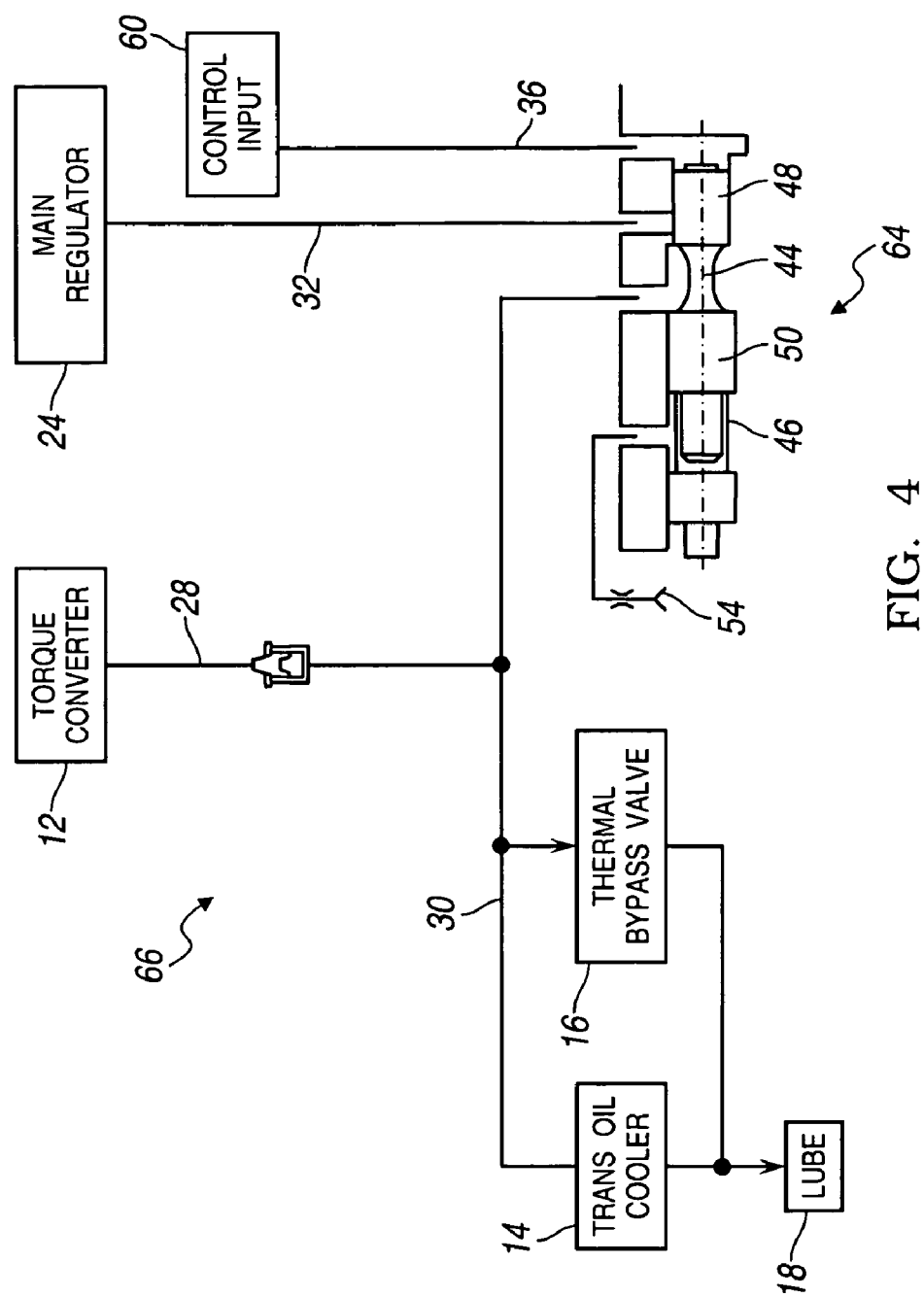
FIG. 4 is a schematic diagram of an alternate embodiment of the circuit of FIG. 3.

Referring to the system 66 of FIG. 4, the control input 60 carried in line 36 to control valve 64 is a pressure signal from another circuit, e.g., line pressure or clutch pressure, as described with reference to FIG. 2.

The flow rate to oil cooler 14 and lube circuit 18 decreases when the magnitude of pressure in line 36 increases. The flow rate to oil cooler 14 and lube circuit 18 increases when the magnitude of pressure in line 36 decreases.

However, by redirecting the control pressure in line 36 to the left-hand end of valve 20, the flow rate to oil cooler 14 and lube circuit 18 increases when the magnitude of the control pressure in line 36 increases, and the flow rate to oil cooler 14 and lube circuit 18 decreases when the magnitude of pressure in line 36 decreases.

Figure 5:
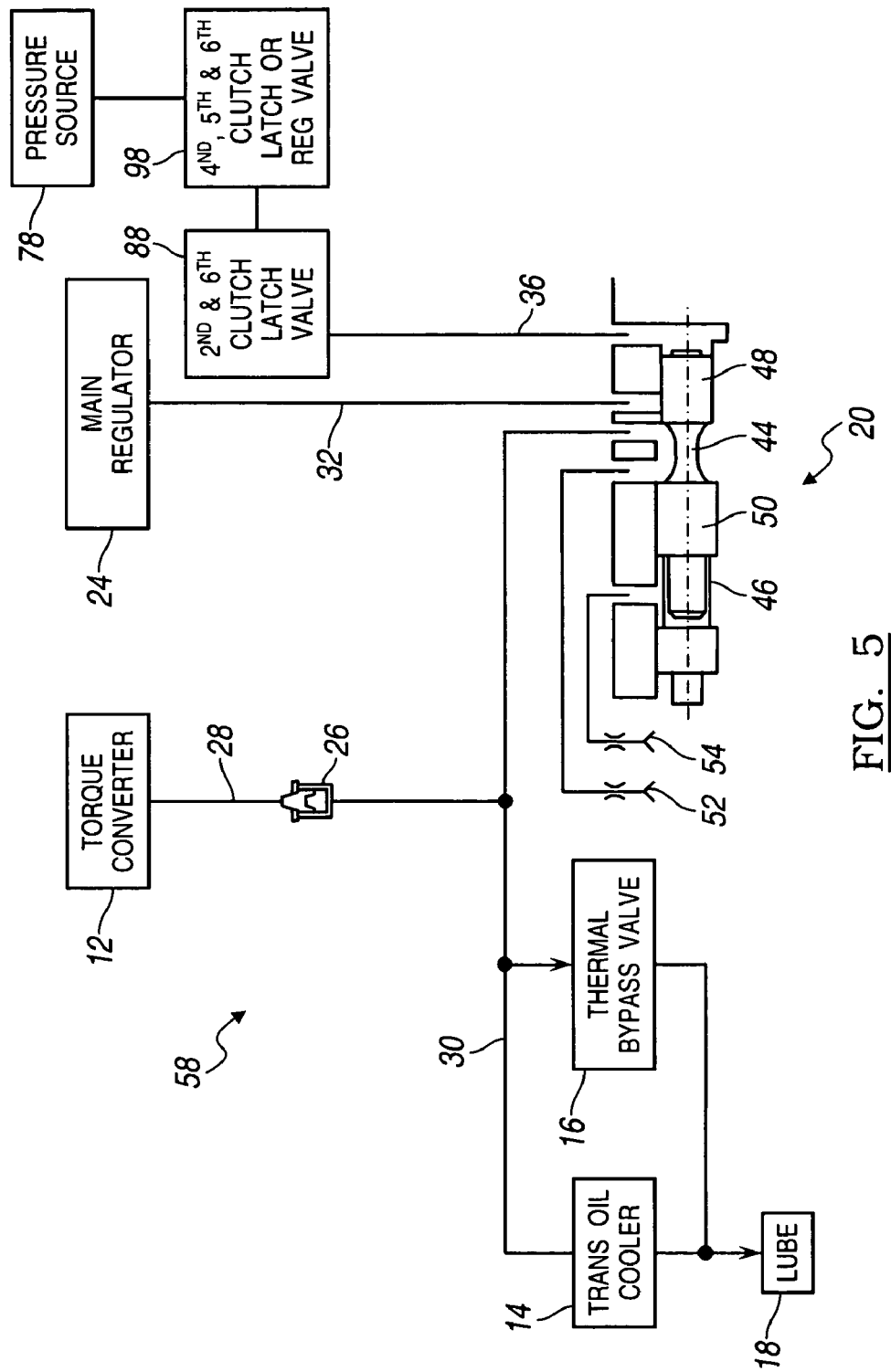
FIG. 5 is a schematic diagram of an alternate embodiment of the circuit showing the AND function for reduced lube in a sixth gear.
Figure 6:
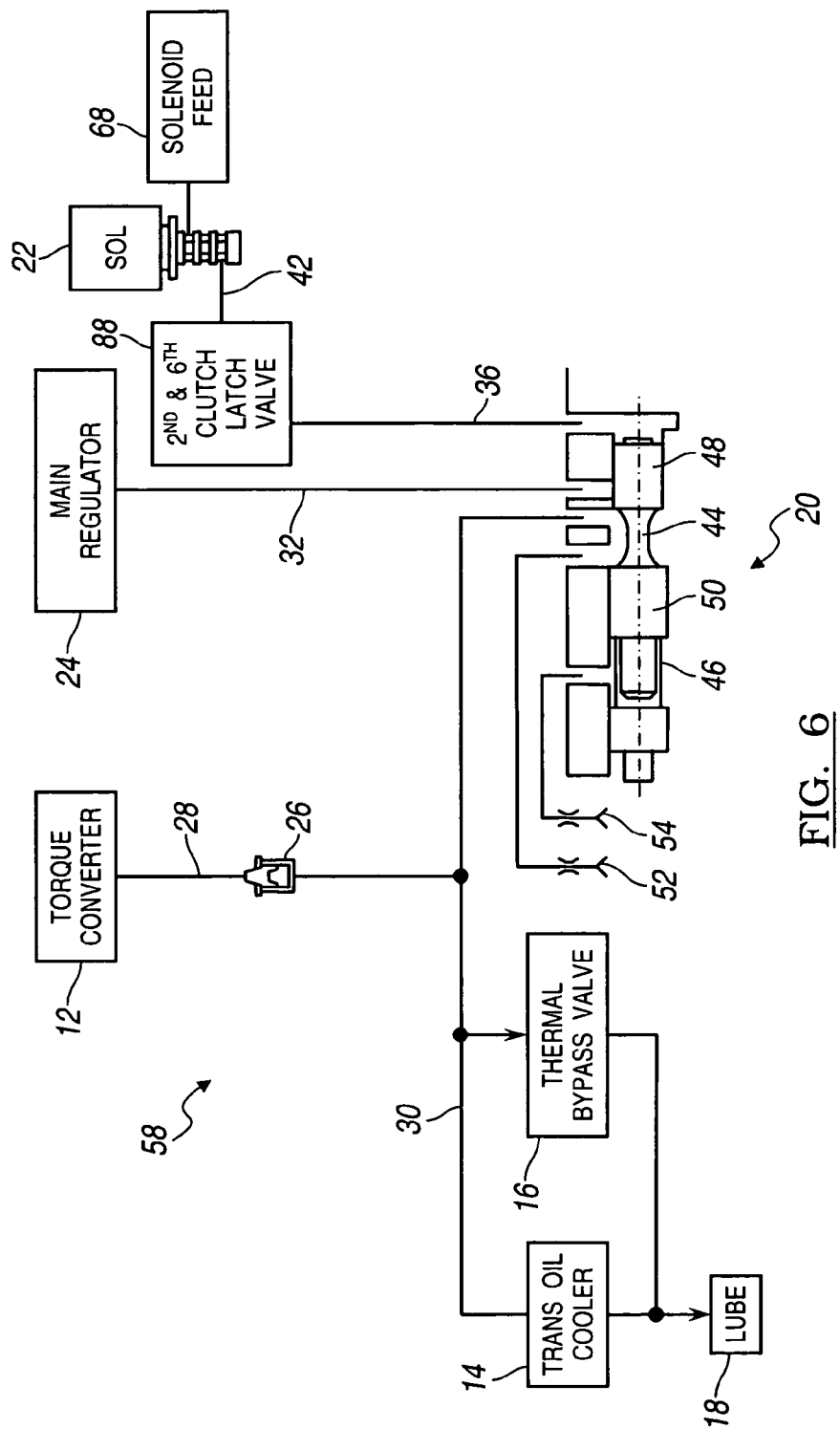
FIG. 6 is a schematic diagram of an alternate embodiment of the circuit of FIG. 5, showing the AND function for reduced lube in the sixth gear.

If reduced lube flow is desired in a particular gear, e.g., sixth gear, it can be achieved by the method shown in FIG. 5. The pressure output from a clutch control valve 98 that is engaging its clutch is sent thought the latch valve 88 of the other required element (clutch) for that particular gear, sending or exhausting the pressure on valve assembly 20. When both valves are latched or shuttled in the manner of an AND logic gate, indicating that the transmission is operating in sixth gear, high pressure from control input 60 is directed through line 36 to the right-hand side of valve 20. Therefore, the flow rate to oil cooler 14 and lube circuit 18 decreases when the transmission operates in sixth gear.

When transmission operates in a gear other than sixth gear, at least one of the valves will unlatch causing control pressure 36 to decrease and the flow rate to oil cooler 14 and lube circuit 18 to increase.

In accordance with the provisions of the patent statutes, the preferred embodiment has been described. However, it should be noted that the alternate embodiments can be practiced otherwise than as specifically illustrated and described.

The invention claimed is:

1. A fluid system for controlling a flow rate in a vehicle transmission, comprising:
    a fluid source;
    a cooler;
    a source of control pressure;
    a valve for regulating a rate of fluid flow from the fluid source to the cooler in response to the control pressure; and
    a lube circuit communicating with the cooler.

2. The system of claim 1 wherein the fluid source is one of a torque converter and a main regulator.

3. The system of claim 1 further comprising:
    a bypass valve arranged in parallel with the cooler and hydraulically communicating with the fluid source and the valve.

4. The system of claim 1 further comprising:
    a bypass valve arranged in parallel with the cooler and hydraulically communicating with the source of fluid and the valve; and
    wherein the lube circuit is located downstream from and communicating with the bypass valve.

5. The system of claim 1 wherein the source of control pressure comprises:
    a source of solenoid feed pressure;
    a valve connected to the solenoid feed pressure source and actuated by a solenoid, for producing a variable magnitude of control pressure.

6. The system of claim 1 wherein the source of control pressure comprises a source of line pressure control.

7. The system of claim 1 wherein the source of control pressure produce a first pressure indicating that the transmission is operating in a reference gear and a second pressure indicating that the transmission is operating in a gear other than the reference gear.

8. A fluid system for controlling a flow rate in a transmission for an automotive vehicle, comprising:
    a source of fluid;
    a cooler;
    a second source of control pressure;

a valve for controlling a rate of fluid flow from the first source to the cooler by changing an open state of a connection between the first source and a vent port in response to a change in the control pressure.

9. The system of claim 8 wherein the fluid source is one of a torque converter and a main regulator.

10. The system of claim 8 further comprising a lube circuit located downstream from and communicating with the cooler.

11. The system of claim 8 further comprising:
a bypass valve arranged in parallel with the cooler and hydraulically communicating with the fluid source and the valve.

12. The system of claim 8 further comprising:
a bypass valve arranged in parallel with the cooler and hydraulically communicating with the fluid source and the valve;
a lube circuit located downstream from and communicating with the cooler and the bypass valve.

13. The system of claim 8 wherein the source of control pressure comprises:
a source of solenoid feed pressure;
a valve connected to the solenoid feed pressure source and actuated by a solenoid, for producing a variable magnitude of control pressure.

14. The system of claim 8 wherein the source of control pressure comprises a source of line pressure.

15. The system of claim 8 wherein the source of control pressure produce a first pressure indicating that the transmission is operating in a reference gear and a second pressure indicating that the transmission is operating in a gear other than the reference gear.

* * * * *